Inventor
Cecil Burton Barber
by Albert M. Parker
Attorney

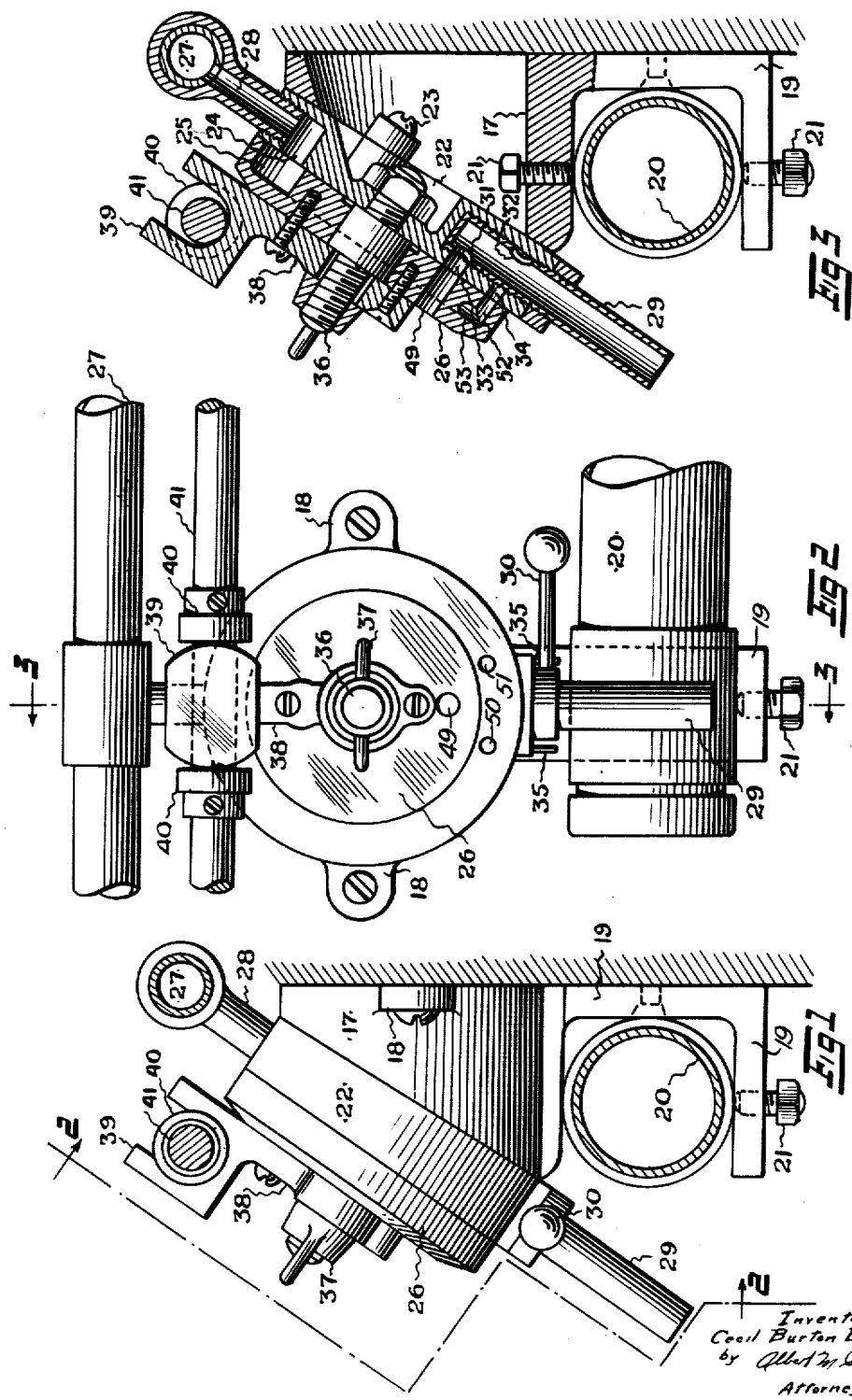

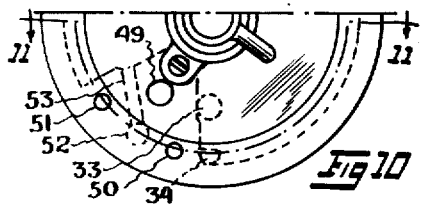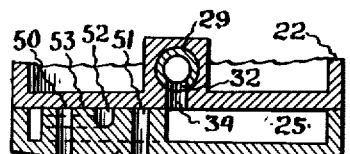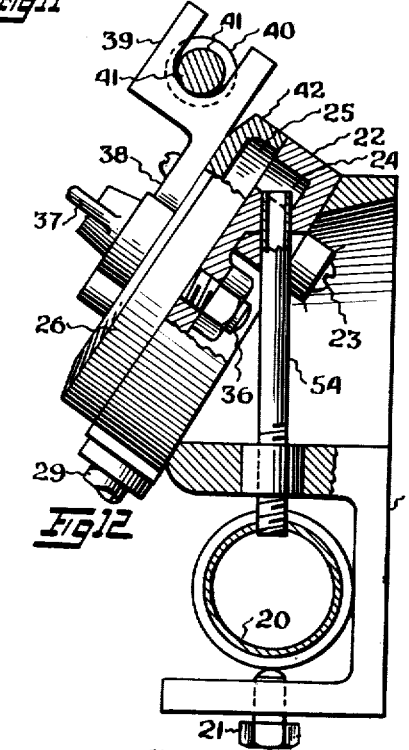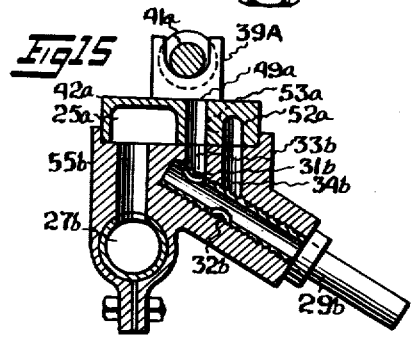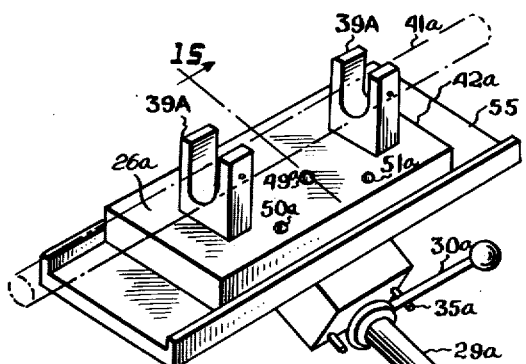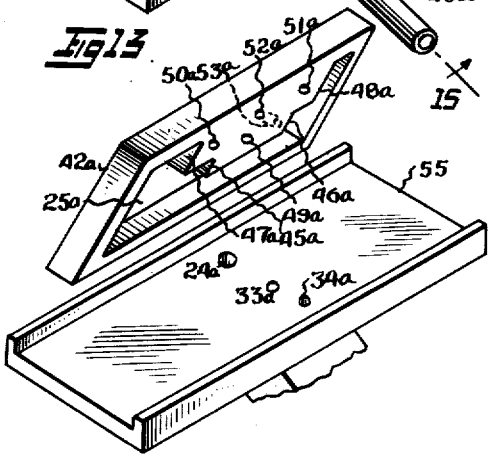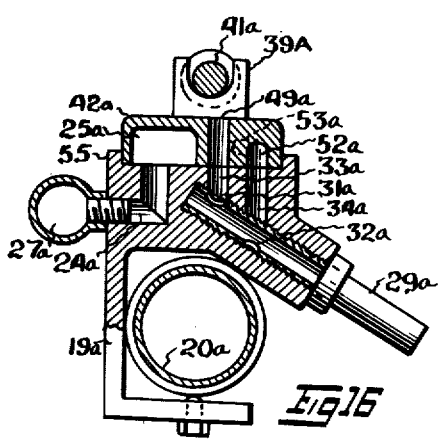

Oct. 9, 1951 C. B. BARBER 2,570,749
PULSATOR FOR MILKING MACHINES
Filed Oct. 23, 1945 4 Sheets-Sheet 4
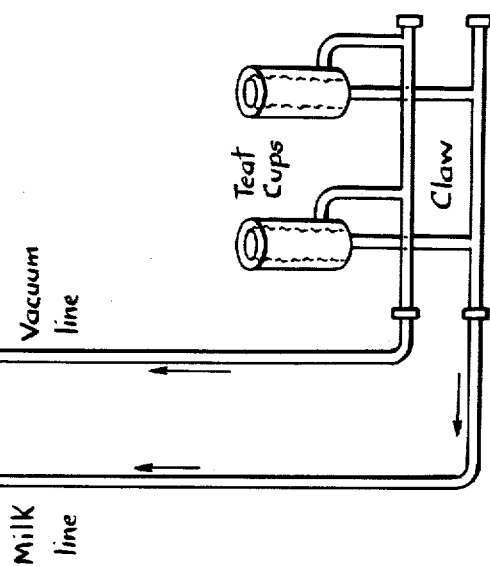
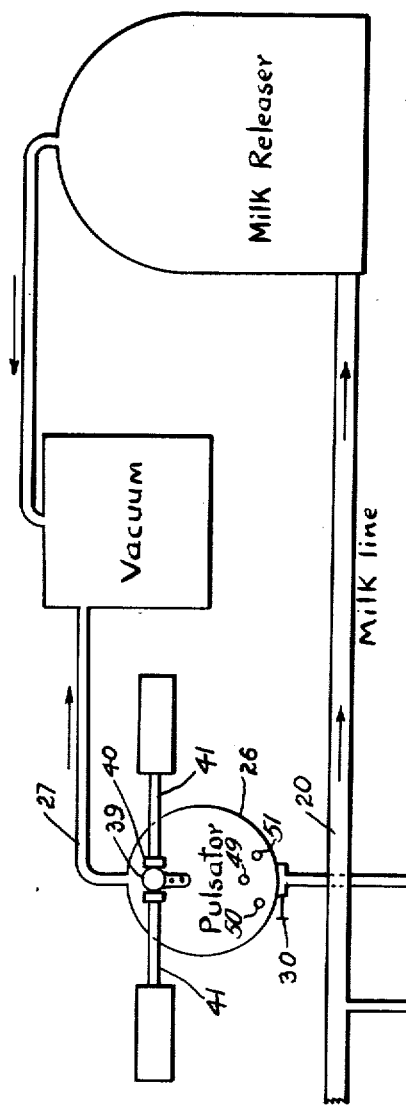
Fig.17.
INVENTOR.
CECIL BURTON BARBER
BY
ATTORNEY Patented Oct. 9, 1951

2,570,749

UNITED STATES PATENT OFFICE 2,570,749

PULSATOR FOR MILKING MACHINES

Cecil Burton Barber, Sydney, New South Wales, Australia

Application October 23, 1945, Serial No. 624,062
In Australia October 17, 1944

13 Claims. (Cl. 137—145.1)

1

This invention relates to milking machines and more particularly to the pulsator thereof for use with either single or double pipe lines.

It has been found that considerable wear and tear takes place on the mechanical parts, surfaces and the like of the pulsator and of the mechanical driving mechanism thereof. Moreover it has been found that, to obtain the correct or approximately correct rate of pulsations for normal use the mechanical movements of the machines are faster than desirable. Furthermore, with the usual mechanical arrangements existent it has not been heretofore possible to secure all the milk that the cow can give by the machine, recourse being had to hand stripping to obtain the milk often withheld by the cow under the normal rate of pulsations of the machine.

It is an object of this invention to provide means of a simple and durable form which operates at a slower speed than usual, thereby cutting down undue wear and tear but which maintains the usual rate of pulsations on the "air" or vacuum line.

It is another object of the invention to provide means which result in an increased rate of pulsation on the "air" or vacuum line being obtained when required for stripping thereby obviating the hand finishing as heretofore referred to, but wherein the rate of movement remains constant.

A further object of the invention lies in the provision of a pulsator construction which is applicable in use for double pipe lines but is readily convertible for use with a single pipe line wherein the vacuum is conducted through the milk pipe rather than having separate pipes for vacuum and milk as in the double pipe line system.

Furthermore the invention lends itself to a form of construction utilizing a reciprocating or oscillating movement of the pulsator mechanism.

According to this invention a pulsator is provided having a vacuum chamber in communication with the vacuum line, a pipe leading into the vacuum chamber through one port for one function and through another port for another function, thereby connecting the chamber with the pipe which leads to the rubber teat surround, a further port or set of ports venting the teat surround pipe line to atmosphere and means to cause registration of the corresponding ports to break the vacuum in the teat surround cavity pipe line at least twice during each full movement of the means causing the port registration.

Moreover the pulsator is provided with means

2 readily operable at will to translate the normal action of two atmospheric ventings per movement into twice that number by which translation the milk stripping is obtained.

Furthermore the action referred to of two or four atmospheric ventings per movement is dependent again on the disposition of two sets of two shoulders in the vacuum chamber cutting the vacuum from the rubber teat surround. In the second case of four atmospheric ventings per movement an additional port in communication with the vacuum chamber is provided on the vacuum chamber seating between the shoulders thereof whereby the said duplicate pulsations are obtained for milk stripping.

From the foregoing it will be seen that the pulsations obtained are restricted to the "air" or vacuum teat surround pipe line and are not to be considered in regard to the known method of obtaining rapid pulsations in the milk line that is, in the interior of the inflations or "inside" vacuum, wherein double the normal rate of pulsations is given to the milk line with the object of retaining the teat cup on the teat.

The objects of this invention are obtained in a manner illustrated in the accompanying drawings in which—

Fig. 1 is a side elevation of the oscillatory type of pulsator including mechanical actuation means and the "air" or vacuum pipe line and the milk pipe line.

Fig. 2 is a front elevation of the pulsator as viewed substantially on line 2—2 of Fig. 1.

Fig. 3 is a sectional elevation taken on lines 3—3 of Fig. 2.

Fig. 10 is a further front fragmentary view showing the pulsator in one operative position for stripping.

Fig. 11 is a sectional view on lines 11—11 of Fig. 10.

Fig. 12 shows a modification with the vacuum taken from the milk pipe line.

Fig. 13 is a perspective view showing a modified form of pulsator construction applicable for reciprocatory movement and incorporating the essential features of the oscillatory type of Figs. 1, 2 and 3.

Fig. 14 is a perspective view of the parts of Fig. 13 and showing the underneath part of the cover portion turned up.

Fig. 15 is a section taken on lines 15—15 of Fig. 13 with the pulsator body supported on and in connection with the "air" or vacuum line. The milk line is separate and not shown.

Fig. 16 is a view similar to Fig. 16 but showing an arrangement with "air" or vacuum line and milk line.

Fig. 17 is a diagrammatic showing of so much of a milking system as is necessary to illustrate the relationship of applicant's invention thereto.

Figure 4:
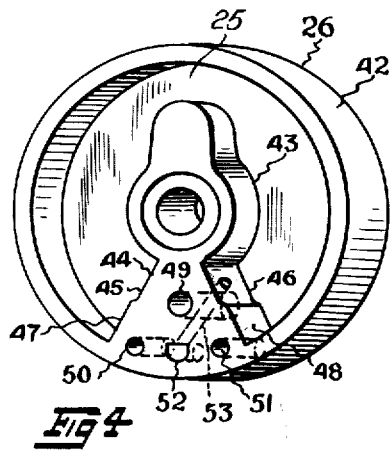
Fig. 4 is a perspective rear view of the cover of the pulsator.

According to this invention the pulsator consists of a standard or hollow casing member 17 provided with wall securement lugs 18 and a depending bracket 19 in which the milk line 20 may be carried as shown in Figs. 1 and 3 or conversely as shown in Fig. 12 the pulsator may be carried by the milk line pipe. Milk line securing studs 21 are provided for this purpose. On the front face of the casing is mounted a relatively thick metal disc 22 which is secured to the casing 17 by studs 23.

In the upper portion of this disc 22 is a port 24 continuously open to the vacuum chamber 25 of the cover 26 hereinafter referred to. The port 24 is in communication with the so called "air" or vacuum line 27 by a short conduit 28.

Into the lower portion of the disc 22 a short pipe 29 is freely screwed being rotatable about 180° on its axis by means of a hand lever 30 so that either one or two ports 31 and 32 in it can be caused to become open or closed to two ports 33 and 34 in the front face of the disc 22.

Figure 5:
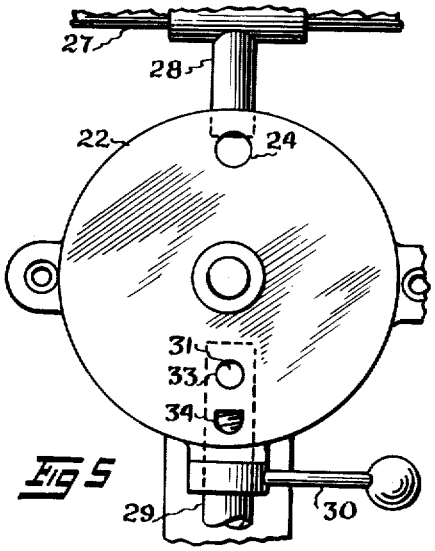
Fig. 5 is a front elevation of the pulsator with the cover removed and on a projection similar to that on line 2—2 of Fig. 1.
Figure 8:
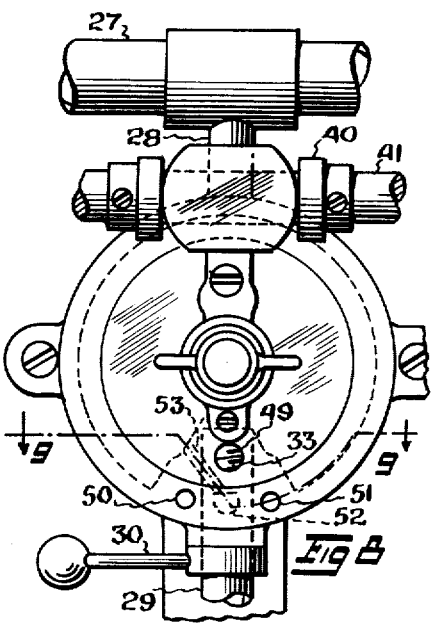
Fig. 8 is a view similar to Fig. 6 showing the pulsator in the translated or switched-over position, i. e. for the other operative or stripping action.
Figure 7:
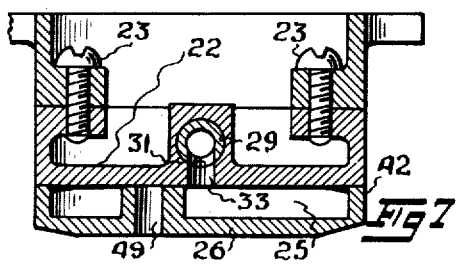
Fig. 7 is a sectional view taken on line 7—7 of Fig. 6.

This is achieved by the pipe 29 having two parallel cuts (or ports 31, 32) across its axis spaced apart by the distance of the ports 33, 34 of the disc resulting in one port 31 being open to port 33 while port 32 is shut to port 34 and vice versa for the purpose set out in detail hereinafter. Two stops 35 are provided on the disc to restrict the circular movement of the pipe beyond 180° and in either one position or the other of the lever the thread of the closing portion of the pipe over the ports 33 or 34 will be seen as shown in Figs. 5 and 8. This pipe leads to the teat "surrounds."

Mounted on the machined face of the disc 22 with close contact thereto is a cover 26 centrally oscillating about a shouldered stud 36 provided with a "wing" nut 37. This cover is caused to oscillate by means of an arm 38 with its abutment 39 coacting between two collars 40 on the reciprocating rod 41 which runs the length of the milking house over the bails; or in the case of the construction of Fig. 13 of two lugs 39-a coacting with the rod.

The cover member generically designated by the numeral 26 is virtually a hollowed disc whereby the wall 42 and the central portion 43 around the stud 36 forms the vacuum chamber 25 which is interrupted by the solid portion 44 as illustrated in Fig. 4.

The solid portion of 44 of the cover is designed in shape and in agreement with its circular movement imparted by the reciprocating rod 41 such that it has four shoulders arranged in two pairs, 45, 46, 47 and 48 which are operatively related respectively to one port 49 and a set of ports 50, 51 and 52 with which they function on oscillation of the cover in a manner further to be detailed, except to state here that ports 49, 50 and 51 are to atmosphere and 52 is connected through the solid by a channel 53 with the vacuum chamber 25.

It will be seen then that the atmospheric ports 49 and 50, 51 and the vacuum port 52 register over the two ports 33, 34 in the solid disc 22 and therefore with the two ports 31, 32 in the pipe within the disc.

The functional characteristics of the invention have so far been described with one constructional embodiment shown on Figs. 1-11 featuring an oscillatory movement of the cover 26. This form of construction may be modified as shown in Fig. 12, so far as the "air" or vacuum line and milk line are described by dispensing with the "air" or vacuum line formerly designated by reference 27 and by utilising the upper portion of the milk line 20 for vacuum for the vacuum chamber 25.

In this form then, the short air pipe 28 is removed and the hole to the port 24 plugged and a short pipe 54 substituted to connect the port 24 with the milk line 20.

There are still however separate connections to the teat and rubber teat surround respectively whereby the teat line leads to the milk line, and the rubber teat surrounds leads to the screwed pipe 29 of the pulsator.

In the description given the pulsator has been described as having the ported disc 22 separate from the body 17. The general construction is not however limited to that form, for the body and the disc may be of unitary construction, dependence being solely dictated by methods of manufacture. A unitary construction is therefore not described in detail.

In Fig. 13 and detailed in Figs. 14, 15 and 16, a different form of construction is given but embodying the same generic functional characteristics as that form already described. In this form the cover generically referred to by numeral 26a is substantially rectangular in shape for a reciprocating action on the base or body portion 55 in which the teat surround pipe 29a and "air" or vacuum line connections are existent as previously described.

It is unnecessary to amplify a description of this construction save by indicating parts in Figures 13, 14 and 16, which correspond to parts shown in Figures 1-11, by the same reference characters employed in Figures 1-11, but with the suffix "a" applied thereto. In Figure 15 the same numbering system is followed with the addition that where a different base is employed from that of Figure 16 the suffix "b" is used instead of "a". The form of construction shown in Figs. 13, 14 and detailed again in Fig. 16 has the "air" or vacuum line 27a connected with the port 24a of the vacuum chamber 25a while the milk line 20a is in the bracket 19a of the base. But in Fig. 15 a construction is shown in which the "air" or vacuum line 27b is embodied in the base to support the pulsator, while the milk line, being remote is not shown.

With the constructional details described the operation of the pulsator will now be given first for normal milking. Taking the view shown in Fig. 5 the lever 30 of the screwed pipe 29 is set over to the right disconnecting the ports 32 and 34 but placing port 31 of the pipe in connection with port 33 of the disc and so to atmosphere when the port 49 of the cover 26 is registering therewith, and also subjecting ports 31 and 33 to vacuum when the shoulders 45, 46 of the solid part 44 of the cover pass by oscillation to the extreme right and left hand positions.

Figure 6:
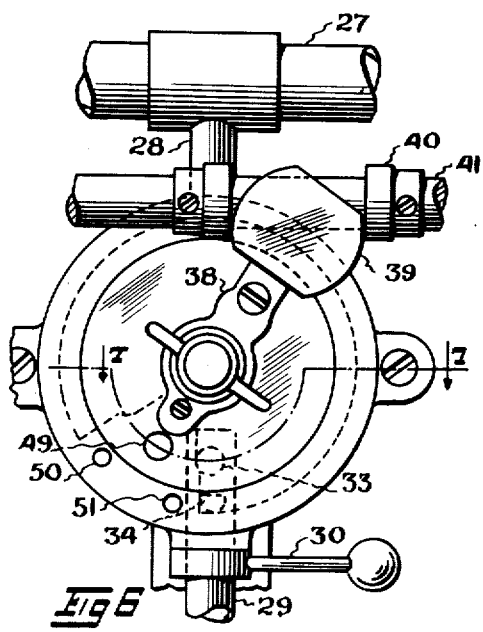
Fig. 6 is a view similar to Fig. 2 showing the pulsator in one operative or normal position.

Thus, in this setting which is that of the normal milking operating position of the pulsator, there will be two suctions and two ventings per full movement or per full out and return stroke of the oscillatory apparatus. That is to say, when the cover is right over to the left as shown in Fig. 6 the ports 31, 33 are uncovered to the vacuum of the vacuum chamber 25 and the teat "surround" by medium of pipe 29 is under vacuum. Then with anti-clockwise circular movement of the solid part of the cover the shoulder 46 cuts off the chamber 25 and holds the vacuum momentarily until on further movement the port 49 comes over ports 31, 33 and connects them to atmosphere. Further movement then cuts the atmosphere, holds the pressure momentarily until the shoulder 45 passes over to allow connection with the vacuum chamber and so on, on the return stroking giving vacuum—atmosphere—vacuum—atmosphere and vacuum again per full out and return stroke. From this then it will be seen that for a reciprocating speed of only 22 full out and return strokes, 44 impulses are imparted to the rubber teat "surround."

Now to retain the same reduced speed of the moving parts but to obtain a still greater number of impulses for milk stripping, the lever 30 is switched over to the left hand side as shown in Fig. 8. This action disconnects the pipe port 31 and disc port 33 but connects the corresponding two, viz. ports 32 and 34 of the pipe and disc respectively.

Figure 9:
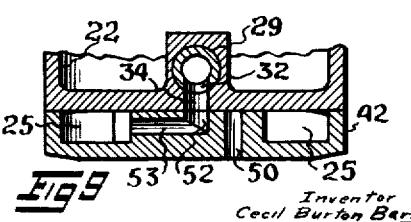
Fig. 9 is a sectional view taken on lines 9—9 of Fig. 8.

Following now an oscillation from left to right of the cover as shown in Figs. 10 and 11 from Figs. 8 and 9, the port 32 of the pipe and port 34 of the disc are in communication with the vacuum chamber 25 and likewise with the teat "surround." Movement in an anti-clockwise manner then causes shoulder 47 to pass over the ports and close them to hold the vacuum momentarily, thereupon the port 50 vents but port 52 being the next port and being under vacuum by channel 53 from the vacuum chamber 25 gives another impulse to the teat "surround" through the ports 32, 34 of the pipe 29. Further movement then brings port 51 over the ports 32, 34 to vent to atmosphere and still further movement causes the shoulder 48 to uncover those ports 33, 34 to the vacuum of chamber 25.

This action then in other words gives vacuum—atmosphere—vacuum—atmosphere — vacuum—atmosphere — vacuum — atmosphere — vacuum again per movement of full out and return strokes, being four impulses per full movement or 88 impulses for 22 mechanical out and return strokes.

The milking action during stripping can be less intense than desired for normal milking. Thus, the stripping ports 50 and 51 may be of smaller diameter than the atmospheric port 49 for normal milking and the disposition of the pairs of shoulders is correspondingly arranged as seen in Fig. 4 for an appropriate lag between the two outer vacuums and the two ventings.

This invention then not only fulfills a definite desire to have in one construction a device by which a stripping action is given on the "air" or vacuum line to avoid hand finishing but gives a device in which an increased rate of pulsation is given for the stripping action.

I claim:

1. In pulsator apparatus, pulsating imparting mechanism, said mechanism being formed to provide series of two or four pulsations per cycle of operation, a conduit to receive said pulsations, a member operatively engaged with said mechanism and formed to engage said conduit, said member being provided with ports to transmit one or the other of said series of pulsations and said conduit being formed for selective communication with one or another of said ports.

2. In pulsating apparatus for milking machines, a pulsation producing unit, means for imparting a cycle of operation to said unit, a pulsation conveying conduit extending from said unit, means, forming part of said unit, for inducing either two or four pulsations into said conduit during a cycle of operation of said unit, and means to effect a translation from two to four pulsation operations per cycle of operation, said translation effecting means including two ports communicating between said conduit and said unit and a valve for inducing either of said two or four pulsations per cycle of operation in said conduit by selecting one or the other of said ports.

3. In a pulsator for milking machines, a base portion formed with a port therethrough, a cover member overlying said base portion and mounting means to mount said cover member and base portion together for relative oscillating movement, said cover member being formed with a vacuum chamber therein in opposition to said base portion, a bridge portion extending across said vacuum chamber and formed with a port therethrough, said last named port and the port in said base member being located to register and connect the port in said base member with the atmosphere in one relative position of said base member and cover member, and said bridge member being formed to expose the port in said base member to said vacuum chamber a plurality of times during said oscillation.

4. A pulsator as in claim 3 wherein said bridge member is a relatively wedge-shaped section with its apex towards the center of said relative oscillating movement.

5. A pulsating device as in claim 3 and including a conduit housing carried by said base portion, said conduit housing being formed with an opening for the reception of a conduit, and the said port in said base portion communicating with said opening in said conduit housing.

6. A pulsator device as in claim 5 and including a conduit in said opening in said conduit housing, said conduit being formed with an aperture in one wall thereof and means to mount said conduit for moving said aperture into and out of registry with said port.

7. In a pulsator device for milking machines, a base member provided with an upper face and a cover member, mounting means for mounting said base member and cover member together for relative oscillation, a conduit receiving housing, provided with a bore therein, formed on said base member, a pair of ports connecting said bore with said upper face of said base member, said cover member overlying said upper face of said base member and formed with a vacuum chamber in opposition to said upper face, a blocking section partially filling said vacuum chamber and obscuring a portion of the same, said blocking section being formed with a plurality of openings extending therethrough, one positioned to align with one of said ports in said base member and the others positioned to align with the other of said ports in said base member, said blocking section, on relative oscillation of said base member and cover member, being formed to expose said ports alternately to said vacuum chamber and said openings.

8. A pulsator device as in claim 7 wherein one of said other openings is formed to communicate with said vacuum chamber.

9. A pulsator device as in claim 7 wherein said blocking section is formed in substantially the shape of a wedge with the apex thereof directed toward the center of oscillation of said base member and cover member.

10. A device as in claim 7 and including a conduit received within said bore, said conduit being formed with an aperture in one wall thereof and means to move said conduit in said bore to bring said aperture into and out of alignment with one of said ports.

11. A pulsator device as in claim 7 and including a conduit received within said bore and formed with a pair of apertures through the side wall thereof, and means to register one of said apertures with one of said ports and the other of said apertures with the other of said ports as desired.

12. In a pulsator device for milking machines, a base member and a disc-like cover member, pivotal mounting means for mounting said cover member about its center for oscillation with respect to said base member, said cover member being hollowed from its underside to form a chamber, said chamber being interrupted throughout a portion of its circumference by a wedge-shaped bridging section closing off a portion of said chamber, said cover member at said wedge-shaped bridging section being formed with an opening extending through from the outer to the inner face of said cover member, and being formed with a plurality of openings at a greater radial distance from said center of oscillation than said first opening and extending through from the outer to the inner face of said cover member, an intermediate opening formed in said bridge section between said plurality of openings to connect said vacuum chamber with the inner face of said cover member, a conduit receiving chamber formed in said base member and a pair of ports formed in said base member extending from said chamber to the upper face of said base member and aligning respectively with said one opening and said plurality of openings in said cover member.

13. A device as in claim 12 and including a conduit in said conduit chamber, said conduit formed with a pair of longitudinally spaced and diametrically opposed apertures in the side wall thereof, said apertures being formed to register respectively with one or the other of said ports as said conduit is turned within said chamber.

CECIL BURTON BARBER.

REFERENCES CITED

The following references are of record in the file of this patent:

UNITED STATES PATENTS

| Number | Name | Date |
|---|---|---|
| 784,780 | Burrell | Mar. 14, 1905 |
| 790,557 | Burrell | May 23, 1905 |
| 1,044,246 | Reid | Nov. 12, 1912 |
| 1,400,792 | Blackmore | Dec. 20, 1921 |
| 1,827,405 | Schmitt | Oct. 13, 1931 |
| 2,039,958 | Hapgood | May 5, 1936 |

FOREIGN PATENTS

| Number | Country | Date |
|---|---|---|
| 9,777 | Australia | Oct. 20, 1933 |

OTHER REFERENCES

Webster, New International Dictionary, 1937, published by G. and C. Merriam Co., Springfield, Mass.

Certificate of Correction

Patent No. 2,570,749 — October 9, 1951

CECIL BURTON BARBER

It is hereby certified that error appears in the printed specification of the above numbered patent requiring correction as follows:

Column 1, line 29, for "finising" read *finishing*; column 3, line 15, for "Fig. 16", second occurrence, read *Fig. 15*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*